(12) United States Patent  (10) Patent No.: US 8,577,552 B1
Smit  (45) Date of Patent: Nov. 5, 2013

(54) FORWARD COLLISION WARNING SYSTEM WITH ROAD-SIDE TARGET FILTERING

(75) Inventor: David Dean Smit, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/572,776

(22) Filed: Aug. 13, 2012

(51) Int. Cl.
  *G06F 17/00* (2006.01)
(52) U.S. Cl.
  USPC .......................................................... 701/41
(58) Field of Classification Search
  USPC .......................................................... 701/41
  See application file for complete search history.

(56) References Cited

U.S. PATENT DOCUMENTS

| | | | |
|---|---|---|---|
| 5,461,357 A | 10/1995 | Yoshioka et al. | |
| 5,508,929 A * | 4/1996 | Harada | 701/48 |
| 5,841,366 A * | 11/1998 | Yamamoto et al. | 340/901 |
| 5,854,987 A * | 12/1998 | Sekine et al. | 701/41 |
| 5,878,361 A * | 3/1999 | Sekine et al. | 701/41 |
| 6,265,991 B1 * | 7/2001 | Nishiwaki et al. | 340/903 |
| 6,434,486 B1 | 8/2002 | Studt et al. | |
| 6,488,109 B1 | 12/2002 | Igaki et al. | |
| 6,864,831 B2 | 3/2005 | Woodington | |
| 7,009,500 B2 | 3/2006 | Rao et al. | |
| 7,046,167 B2 | 5/2006 | Rao et al. | |
| 7,191,049 B2 | 3/2007 | Yajima | |
| 7,974,778 B2 * | 7/2011 | Sawamoto et al. | 701/527 |
| 2005/0114000 A1 | 5/2005 | Cashler | |
| 2011/0098922 A1 * | 4/2011 | Ibrahim | 701/208 |
| 2011/0288774 A1 * | 11/2011 | Bengtsson et al. | 701/301 |
| 2012/0025969 A1 * | 2/2012 | Dozza | 340/463 |
| 2012/0212353 A1 * | 8/2012 | Fung et al. | 340/905 |
| 2013/0158796 A1 * | 6/2013 | Higgins-Luthman | 701/36 |

* cited by examiner

*Primary Examiner* — Thomas Tarcza
*Assistant Examiner* — Alex C Dunn
(74) *Attorney, Agent, or Firm* — Frank A. MacKenzie; Brooks Kushman P.C.

(57) ABSTRACT

A method of filtering/rejecting targets detected by a forward collision warning system of a motor vehicle when entering a curved road segment. The width of a collision threat zone (CTZ) is reduced in one or more stages depending upon continuously-measured values of steering input angle (SIA), driver brake application (DBA), and a yaw rate. The measured values are used to find: a degree of near-past DBA variation during a first look-back period, a degree of near-past SIA change rate during a second look-back period, and a degree of far-past yaw rate change during a third look-back period longer than the first and the second look-back periods. A series of first, second and third width reductions of decreasing severity are applied to the CTZ based upon comparisons of the tracked variations and change rates with respective thresholds. The thresholds are tunable to achieve desired levels or false-target rejection.

20 Claims, 3 Drawing Sheets

FORWARD COLLISION WARNING SYSTEM WITH ROAD-SIDE TARGET FILTERING

TECHNICAL FIELD

The invention relates to Forward Collision Warning systems for motor vehicles, and to a method for reducing the frequency of false warnings based on stationary road-side objects detected when the vehicle is driving on or entering a curved road section.

BACKGROUND

Forward Collision Warning (FCW) generally refers to the use of one or more forward-looking sensors mounted on a host vehicle to detect obstacles in the host vehicle's path. If a potential collision danger to a sensed in-path target is determined to exist, the system can trigger a warning to help the driver avoid the potential collision. Alternatively or in addition, the FCW system may trigger an automatic braking intervention, and/or activate occupant safety systems before a collision actually occurs if it appears unavoidable.

FCW may be implemented along with adaptive cruise control (ACC) and/or collision mitigation by braking (CMbB) systems, all of which may utilize a common radar sensor. FCW may typically provide warning for moving and moveable vehicles, where moveable is defined as a vehicle that has previously been tracked by the radar as moving, but has come to a stop.

A camera-based computer vision system may be added to detect lane markings to thereby enable lane departure warning. The radar and the camera may be combined to detect and then classify targets as vehicles. Radar is the primary detection sensor, and computer vision is the vehicle classifier. Computer vision based vehicle classification is used to expand the operational scope of FCW to include stationary vehicles. Vehicle classification by camera also serves to reduce the likelihood that objects typically not in the roadway, e.g., trees, poles and overhead signs, trigger a false warning.

In systems without a computer vision camera, it would be advantageous to develop an FCW system capable of operating with radar only yet capable of accurately discrimination between stationary and moving targets. However, without a vision sensor for vehicle classification, non-vehicle objects such as trees, poles and overhead signs have the potential to be included as valid, in-path targets to which FCW may potentially respond by issuing a warning. If the object is not truly in the vehicle path, the resulting warning could be interpreted by the driver as a false warning.

One measure of system reliability is the number of false warnings for a given number of miles driven, or the number of false warnings for a given test route. As the number of false warnings increases, the system reliability decreases. If the system reliability is too low, some drivers may become habituated to ignore all FCW warnings or may turn off the FCW system altogether and lose the benefits of warnings for true potential collisions.

Stationary objects may be classified into three basic categories based on where the object is in relation to the roadway: on-road, overhead, and side-of-path or roadside objects. Roadside objects includes guardrails, roadside signs, trees, reflectors, concrete dividers, manhole covers, storm drain covers and raised lane edge markers (such as Bott dots).

Roadside objects may, of course, be present on both straight and curved roads, however false FCW warnings triggered by roadside objects are more prevalent in curved road sections. This is because on a straight section of road it is relatively easy to estimate the predicted path of the host vehicle, while when travelling on a curve (or about to enter a curve) the path prediction is more difficult.

An object is considered to be an out-of-path object only when the lateral clearance between the host vehicle and the target object, after road curvature is taken into consideration, is larger than half of the host vehicle width plus half of the target width. However, most radars currently considered to be appropriate for use on motor vehicles are not capable of accurately determining target width. Instead, the radar data may be used to estimate the target width, or all targets may be assumed to be of a standard width. An object with a smaller width, but laterally close to the host vehicle, could be treated as an in-path object and trigger an FCW warning.

Another factor that may cause out-of-path objects to be falsely identified as in-path is path prediction error. The lateral clearance between the host vehicle and the target object is calculated based on the predicted host vehicle path. A host vehicle path prediction algorithm is generally less accurate during steering transitions from straight to curved road or vice versa. These path errors and subsequent lateral offset errors can cause out-of-path objects on the side of the roadway to be considered as in the host vehicle's path.

SUMMARY

In a disclosed embodiment, a method of forward collision warning for a motor vehicle comprises operating a sensor system to detect a target ahead of the vehicle and identifying a Collision Threat Zone (CTZ) along a predicted path of the vehicle. Vehicle parameters are continuously measured, including a steering input angle (SIA) change rate and a yaw rate of the vehicle. These measured values are used to continuously track a near-past maximum absolute value of the SIA change rate during a first look-back period and a far-past variation of the yaw rate during a second look-back period longer than the first look-back period. A first width-reduction is applied to at least a portion of the CTZ in the event that: a) the near-past maximum absolute value of SIA change rate exceeds a first SIA change rate threshold, and b) the far-past variation of yaw rate exceeds a first yaw rate threshold value. Threat warnings are suppressed for any target that is outside of the CTZ with the first width-reduction applied. The first width reduction may comprise reducing the width to zero, so that a complete block or all threat warnings is in effect.

In another disclosed embodiment, the method further comprises continuously measuring a driver brake application (DBA), continuously tracking a near-past change in the driver brake application during a third look-back period shorter than the second look-back period; and suppressing the threat warning if: a) the near-past change of the driver brake application exceeds a first DBA threshold value; and b) at least one of the near-past maximum absolute value of SIA change rate and the far-past variation of yaw rate exceed the first SIA change rate threshold and the first yaw rate threshold value respectively In another disclosed embodiment, a method of forward collision warning for a motor vehicle comprises operating a sensor system to detect a target ahead of the vehicle, identifying a Collision Threat Zone along a predicted path of the vehicle, and continuously measuring a steering input angle (SIA) change rate, a yaw rate, and a driver brake application. Vehicle parameters are continuously measured, including a near-past maximum absolute value of the SIA change rate during a first look-back period, a far-past variation of the yaw rate during a second look-back period longer than the first look-back period and a near-past variation of the driver brake application during a third look-back period shorter than the second look-back period. Threat warnings are suppressed if: a) the near-past variation of the driver brake application exceeds a DBA threshold, and b) the near-past maximum absolute value of SIA change rate exceeds a first SIA change rate threshold OR the far-past variation of yaw rate exceeds a medium yaw rate threshold.

In another disclosed embodiment, a method comprises operating a forward collision warning sensor of a motor vehicle to detect a target ahead of the vehicle, identifying a collision threat zone (CTZ) ahead of the vehicle in which the target is considered a collision threat, the CTZ having a base width, and continuously measuring a steering input angle (SIA) change rate, a driver brake application (DBA), and a yaw rate. The measured values are used to find: a degree of near-past DBA during a first look-back period, a degree of near-past SIA change rate during a second look-back period, and a degree of far-past yaw rate during a third look-back period longer than the first and the second look-back periods. A first width reduction is applied to the CTZ if either: 1) the near past SIA change rate exceeds a peak SIA change rate threshold, or 2) the near-past DBA indicates braking; and either a) the near past SIA change rate exceeds a second SIA change rate threshold lower than the peak SIA change rate threshold, or b) the far-past yaw rate exceeds a first yaw rate threshold. Threat warnings are suppressed if the target is outside of the CTZ with the first width reduction applied.

In a still further disclosed embodiment, the method further comprises, in the event that the conditions to apply the first width reduction above are not met, applying a second width reduction less restrictive than the first width reduction to the CTZ when: a) the near-past maximum absolute value of SIA change rate exceeds the second SIA change rate threshold, and b) the far-past variation of yaw rate exceeds the first yaw rate threshold value; and suppressing the threat warning if the target is outside of the CTZ with the second width-reduction applied.

In a still further disclosed embodiment, the method further comprises, in the event that the conditions to apply the first and second width reduction above are not met, applying a third width reduction less restrictive than the second width reduction to the CTZ when: a) the near-past maximum absolute value of SIA change rate exceeds the second SIA change rate threshold; and b) the far-past variation of yaw rate exceeds a second yaw rate threshold lower than the first yaw rate threshold.

BRIEF DESCRIPTION OF THE DRAWINGS

Embodiments of the present invention described herein are recited with particularity in the appended claims. However, other features will become more apparent, and the embodiments may be best understood by referring to the following detailed description in conjunction with the accompanying drawings, in which:

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
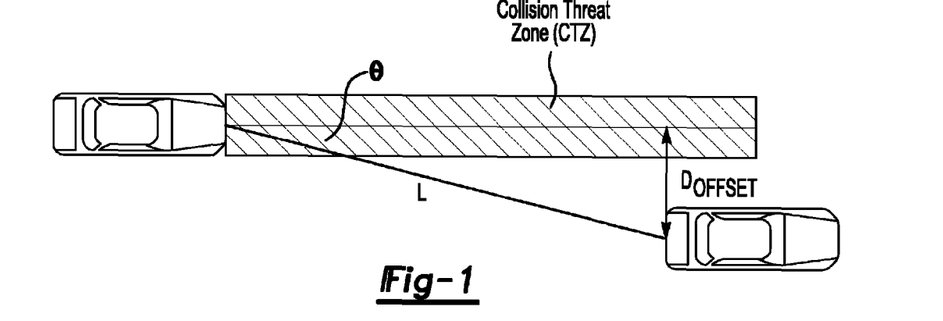
FIG. 1 is a schematic depiction of a collision threat zone (CTZ) of a host vehicle travelling along a straight road segment.

FIG. 1 depicts a collision threat zone (CTZ) for a host vehicle travelling along a straight road segment (host vehicle yaw rate equal to zero). The CTZ is in the predicted path of the moving vehicle and is identified to minimize the number of side-of-path objects that will be considered as valid targets. If a target object, moving or stationary, or a significant portion of an obstacle, falls within the CTZ, it is considered a valid target. Any target detected that falls outside the CTZ is not considered a valid target, and no FCW warning is issued.

The CTZ is centered on the predicted host vehicle path and projects forward from the front of the vehicle. The host vehicle's projected path originates from the center of the host vehicle and projects forward in a straight line when the host vehicle is travelling straight ahead. The CTZ is ideally set to the exact width of the host vehicle. In the most general case, the predicted path is based on the host vehicle's current yaw rate and longitudinal velocity and accounts for any turning action by the host vehicle.

The lateral distance between the centerline of the host vehicle's projected path and the target is indicated in FIG. 1 as $D_{OFFSET}$. On a straight road, $D_{OFFSET}$ is simply the host-to-target lateral offset. For a target at the range of L meters and azimuth angle of θ radians, $$D_{OFFSET} = L \sin \theta \tag{1}$$

To check whether or not a target falls into the CTZ, simply subtract half the target width from the lateral offset. The target width for radar-only FCW may be an assumed width if the radar does not provide target width information, or if the accuracy of the available target width information is less than desired.

Figure 2:
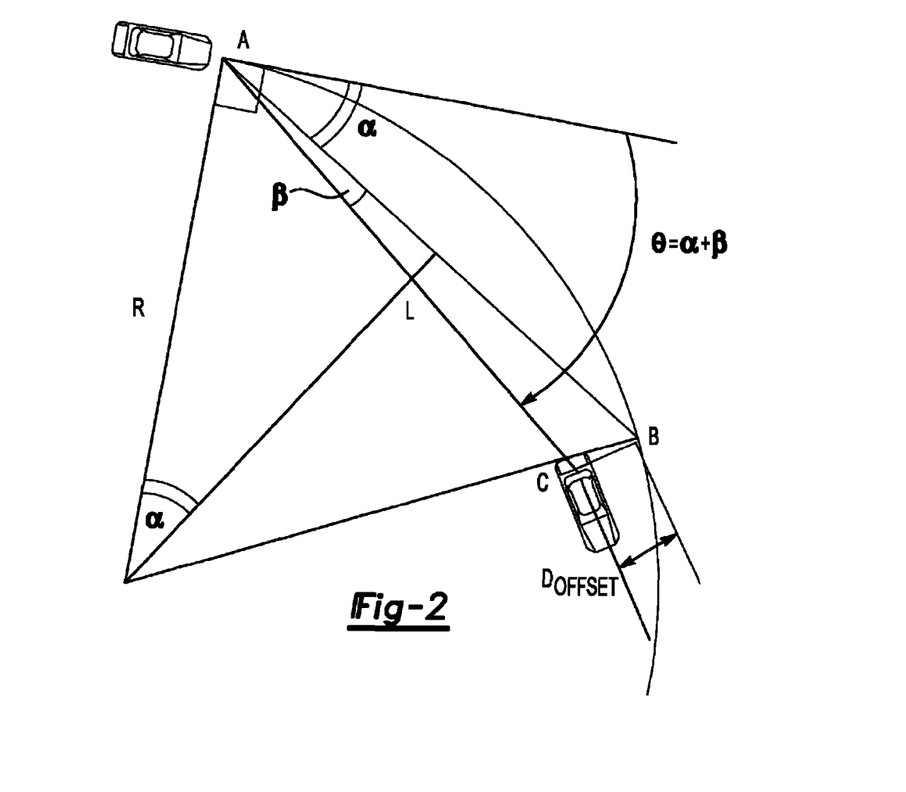
FIG. 2 illustrates the geometry of a generic curved road section.

FIG. 2 illustrates the geometry of a generic curved road section, arc AB being the predicted path of the host vehicle as it follows the road, with radius R. A is the front center point of host vehicle. C is the center point of the target vehicle. B is a point on the predicted path having the same range from point A as C.

Road Curvature Angle α is the angle at the host vehicle center A between the tangent of the arc of the predicted path of radius R and line AB. Target azimuth angle θ is the sum of Road Curvature Angle α and angle β. To subtract Road Curvature Angle α from target azimuth angle θ is equivalent to converting $D_{OFFSET}$ for a curved road to $D_{OFFSET}$ for a straight road.

From geometry, $$\alpha \approx \sin^{-1}\left(\frac{L}{2R}\right) \tag{2}$$

$$D_{offset} \approx L\sin(\theta - \alpha) \approx L\sin\left(\theta - \arcsin\left(\frac{L}{2R}\right)\right) \tag{3}$$

Target offset $D_{OFFSET}$ is shown in FIG. 2 as $\overline{CB}$.

The road curvature angle a may be calculated from the measured host vehicle yaw rate thus:

$$\alpha = \frac{L}{2} \times \frac{\omega}{v} \quad (4)$$

Where:
L—Target range in meters
ω—Host vehicle yaw rate in radians/s
v—Host vehicle speed in meters/s Ideally, this stationary target CTZ discriminates between roadside objects (not a collision threat) and stationary objects that are in the travel lane. However, due to a number of factors (such as noise associated with real-world radar sensor data and errors in the prediction of the path of the host vehicle), a significant number of roadside objects may still be included in the CTZ area and therefore falsely treated as valid targets.

Several factors may result in loss of accuracy of path prediction, including any inherent measurement error of yaw rate and target azimuth angle. Another potentially significant error inducing factor is the driver's unintentional movement of the steering wheel (or other steering input control, for a vehicle so equipped) during lane keeping. Variations in the steering input angle (SIA) signal can be explained as the small, random steering corrections. It has been found that driver-induced SIA variation alone can cause $D_{OFFSET}$ error at least in the range of [−0.4, 0.4] meters.

As discussed above, one of the primary causes of false warnings on road side objects is error associated with host vehicle path prediction based on yaw rate. When the host vehicle is entering a curve or travelling along a curve having a decreasing radius, it becomes particularly difficult to mitigate false warnings caused by road side objects.

False warnings due to road side objects may be reduced or eliminated in two ways: a) Using an improved path-prediction method to determine whether objects detected are or are not in the host vehicle's path; and b) Reducing the CTZ width for which targets will be considered valid. The CTZ width reduction may be applied in stages depending on combinations of parameters (as discussed below) and may include reducing the CTZ width to zero, the equivalent of completely blocking the FCW warning. The objective is to maintain as much true warning capability in curves as possible while providing excellent rejection of false warnings for these scenarios.

Figure 3:
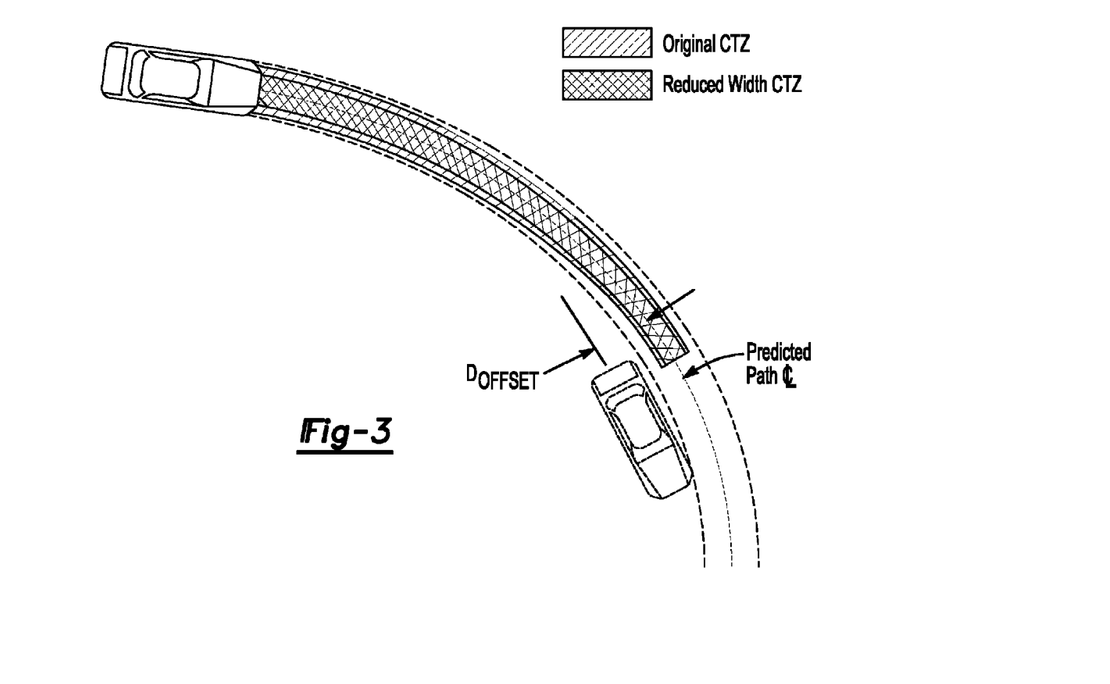
FIG. 3 is a schematic depiction of a CTZ of a host vehicle travelling along a curved road segment.

Reduction of CTZ width may be achieved by applying a width reduction filter to all or a portion of the CTZ. An example of such a width-reduced CTZ is shown in FIG. 3. The width of the CTZ is reduced more drastically as distance from the host vehicle increases, tapering to a minimum width at the maximum range of the CTZ. Any stationary vehicle or other objects within the boundary of the reduced width CTZ is considered valid by the algorithm and therefore may trigger an FCW warning.

As discussed earlier, using yaw rate alone to predict the host vehicle path may lead to high levels of error at the entry to a curve or when the radius of the curve is decreasing. Under these conditions, the yaw rate may lag changes in SIA (driver movement of the steering wheel, in most cases), so that SIA may provide an earlier and better estimate of the path required to negotiate the curve. Using SIA input to generate the path prediction has been found to effectively filter out objects that will be out-of-path, but still maintain true warnings for objects on curves that are in the host vehicle's path on a curve.

The SIA-based path prediction is calculated by first estimating the host vehicle yaw rate by measuring host vehicle SIA and host vehicle speed, and entering a look-up table with those values. The look-up table values may be determined empirically by analyzing real-world test data. The estimated yaw rate from the look-up table is then used to calculate a SIA-based $D_{OFFSET}$, or path prediction, in the same fashion as the $D_{OFFSET}$ calculated from the actual yaw rate signal.

The SIA-based path prediction also includes a minimum SIA threshold, below which the predicted yaw rate is zero, and consequently the predicted path is straight ahead. This threshold may be necessary to account for situations where the host vehicle's steering system center-find algorithm predicts a non-zero SIA when the vehicle is actually traveling straight.

Empirical evidence has shown there to be some variation in the SIA-to-yaw rate ratio from one vehicle to another. The ratio is dependent on a number of vehicle parameters, and can be expected to vary within the same vehicle design. However, the accuracy of this prediction is not necessarily critical. If the predicted yaw rate and $D_{OFFSET}$ are too large, a true target in a curve could be predicted to be out of path and no warning provided. Compared to a countermeasure design without a SIA-based path prediction, but still with the goal to minimize false warnings at curves, the warning would probably still be missed due to the driver steering input. If the error is such that the predicted yaw rate and $D_{OFFSET}$ are too small, then a true warning for a target in the host's path on a curve would still be provided. However, the likelihood of false warnings for road side objects would increase. In this case, if the number of false warnings is acceptable, including the SIA-based path prediction provides improved warning performance in curves, even if it doesn't occur 100% of the time. In other words, providing some true warning performance in curves, even if there is some variation in performance between vehicles, may still be a preferred approach to providing no true warnings in these situations.

Studies have indicated that a significant portion of warnings associated with curves occur when the yaw rate is one degree/second or greater and/or SIA is 10 degrees or greater. Such studies have also indicated that both yaw rate and SIA are relatively high for false curve entry warnings on "curvy roads", where the host vehicle is travelling from one curve into another. Also, there is generally some SIA input associated with many of the false warnings occurring at or just prior to curve entry, where the vehicle was on a relatively straight road prior to the warning. In many of these cases the yaw Rate is still very low.

Empirical analysis of curve entry events has led to the following observations:

Recent history of the yaw rate could be useful for determining that the driver is in "curvy" road conditions, even if the current yaw rate is very low;

Recent SIA changes often occurred prior to the warning and provide an early indication that the host vehicle may be entering a curve;

Recent brake application by the driver of the host vehicle (driver brake application, or DBA), especially associated with a SIA change, is a strong indication that the host vehicle is entering a curve; and SIA changes and DBA are most useful in the very recent history (less than 1 second prior to the warning). The yaw rate, however, is most useful looking farther back (up to ten seconds) to determine whether "curvy" road conditions are being experienced.

Figure 4:
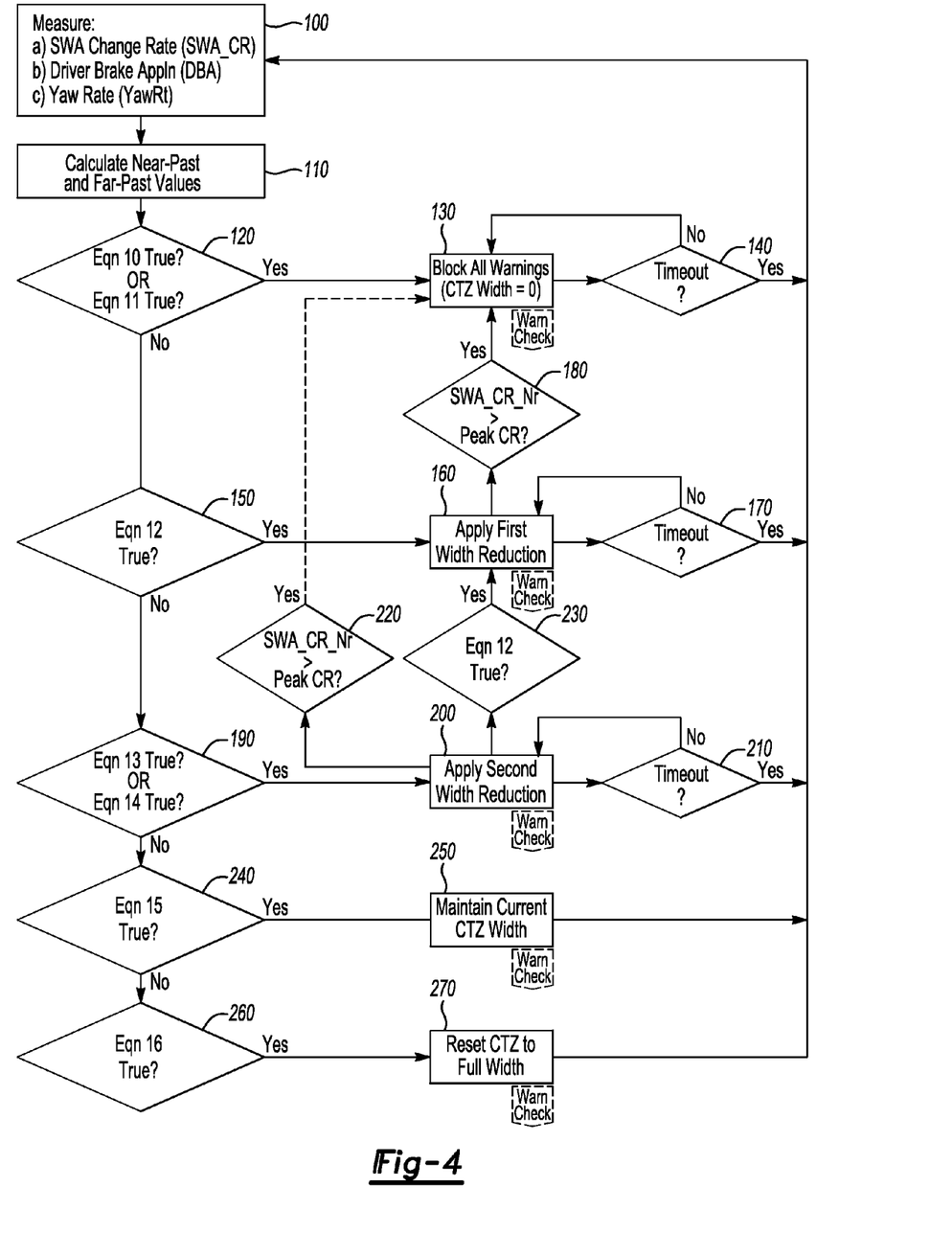
FIG. 4 is a flow-chart of a method for reducing false FCW warnings.

A method will now be described, with reference to FIG. 4, which makes use of the above discoveries. Beginning at block 100, the values of SIA, DBA, and Yaw Rate (all of the host vehicle) are continually measured by appropriate sensors.

At block 110, a signal tracking algorithm maintains a signal history for each of the three measured parameters by storing maximum and minimum signal values at fixed time intervals (data points), and then rolling the stored values in a first-in-first-out (FIFO) manner such that the oldest values are thrown away as new values are added. The fixed time interval at which the data points are stored is determined by dividing the time over which the signal history is being tracked (hereinafter called the look-back period) by the number of points being tracked. As an example, ten sets of maximum and minimum values are tracked for the "Far" look-back period, and five sets of maximum and minimum values are tracked for the "Near" look-back period. The fixed time interval between data points for the "Far" look-back period is therefore:

$$\frac{\text{Far History Time}}{10};\qquad(5)$$

and the "Near" time interval is:

$$\frac{\text{Near History Time}}{5}.\qquad(6)$$

For example, if the "Far" look-back period time is ten seconds, then the new data $$\frac{10}{10}=1$$

points are stored every second. If the "Near" look-back period time is 0.6 seconds, then the $$\frac{0.60}{5}=0.120$$

new "Near" data points are stored every second.

As new data values are continuously added, the signal tracking algorithm outputs the new maximum and minimum of all the tracked points over the appropriate time interval. For the example numbers above, therefore, new "Far-Max" and "Far-Min" values are provided each second as the maximum and minimum of the ten historical maximum and ten minimum stored data points, respectively. Similarly, new "Near-Max" and "Near-Min" values are provided every 0.120 second as the maximum and minimum of the five historical maximum and minimum stored data points, respectively.

For the Yaw Rate signal, the final calculation of the maximum signal change over the look-back period is made by subtracting the minimum value during the look-back period from the maximum value during the look-back period as shown below:

Yaw Rate Change "Far"=Yaw Rate Max "Far"−Yaw Rate Min "Far" (7)

For the SIA Change Rate (SIA_CR) signal, consider the absolute value of the "Near" look-back period signals maximum, minimum, and current SIA_CR, and selecting the largest value. Including the current SIA_CR ensures the maximum SIA_CR is always being considered, even if it is the latest/most current measurement. The SIA_CR "Near" measure is therefore calculated as:

$$\text{SIA\_CR"Near"}=\text{Max}\begin{Vmatrix}\text{SIA\_CR Max "Near"}\\ \text{SIA\_CR Min "Near"}\\ \text{SIA\_CR Current}\end{Vmatrix}\qquad(8)$$

For Driver Brake Application (DBA), brake application may be assumed to be binary, such that DBA=0 when no brake applied, and DBA=1 when any braking is applied. For this assumption, simply check whether a signal change greater than 0.5 occurred in the "Near" look-back period. Similar to the calculation above of SIA_CR, the "Near" calculation includes the current/most recent DBA measurement. The DBA "Near" look-back period signal calculation is:

$$DBA\text{"Near"}=\begin{vmatrix}1 & \text{if}\begin{bmatrix}\text{DBA\_Max "Near"}-\text{DBA\_Min "Near"}>0.5\\ \text{and}\\ \text{DBA Current}>0.5\end{bmatrix}\\ 0 & \text{Otherwise}\end{vmatrix}\qquad(9)$$

Regarding DBA, it is also possible to monitor/track the degree of braking being applied by the driver, rather than the more simple binary assumption described above.

Beginning at block 120, the algorithm utilizes the signal tracking information described above to determine whether to reduce the CTZ width, and how much width reduction is appropriate. Depending on the recent level of driver steering input (as indicated by the look-back period signal, SIA_CR "Near"), whether the driver has recently applied the brake (DBA "Near"), and the vehicle's Yaw Rate Change "Far", the filter will either:

a) block all warnings (CTZ width reduced to zero),
b) apply a first width reduction to the CTZ (less restrictive than the warning block),
c) apply a second width reduction (less restrictive than the first width reduction) to the CTZ, or
d) leave the CTZ width at the full original width.

As the driver input (as measured by the signal histories over the look-back periods) indicate greater SIA input and driver control, the width of the CTZ is reduced so that FCW system warnings only occur in response to targets that are very centered in the path of the vehicle. With sufficiently high driver steering inputs, no warnings at all are allowed, so essentially the width of the CTZ is reduced to zero. The details for each of possible CTZ width adjustment actions are provided below.

At block 120 the following relationships are evaluated:

SIA_CR "Near"≥Peak_CR (10)

OR $$DBA\text{ "Near"}>0\text{ AND}\begin{bmatrix}\text{SIA\_CR "Near"}\geq\text{Min\_CR}\\ \text{OR}\\ YawRate\text{ "Far"}\geq\text{Med\_YawRt}\end{bmatrix},\qquad(11)$$

where the parameters "Peak_CR", "Min_CR", and "Med_YawRt" may be tuned to establish desired performance of the target rejection filter. Tuning may be accomplished by computer simulation/modeling and/or by real-world testing.

If either of equation 10 or 11 are true (block 120, "YES"), the all warnings issued by the FCW system based on detection of roadside objects are blocked (see block 130). This is, in effect, the equivalent of reducing the width of the CTZ to zero. The complete block on warnings remains in place at least until the block warning timer has elapsed (block 140, "YES"), at which time the routine loops back through blocks 100-120. If the result of block 120 is still "YES," the warning block remains in place. The duration for the block warning timer is tunable.

Once neither of eqns. 10 or 11 are true (block 120, "NO"), the method progressed to block 150 where the following checks are made:

$$\begin{bmatrix} \text{SIA\_CR "Near"} \geq \text{Min\_CR} \\ \text{AND} \\ YawRate \text{ "Far"} \geq \text{Med\_YawRt} \end{bmatrix}, \quad (12)$$

where "Min_CR", and "Med_YawRt" are tunable parameters.

The values for all "tunable parameters" referred to herein may be determined by testing of real vehicles and/or by computer modeling, in a manner generally as discussed in Example I through Example V below.

If block 150, "YES", a first width reduction is applied to the CTZ at block 160. The first width reduction narrows the CTZ sufficiently to achieve an acceptably low level of false warnings caused by roadside objects. Similar to the complete warning block of block 130, the first width reduction is maintained for the duration of a first width reduction timer (block 170). However, if during that time period SIA_CR "Near" increases to the point that SIA_CR "Near"≥Peak_CR (block 180, "YES"), the routine returns to block 130 and all warnings are blocked.

Once the relationships in eqn. 12 are no longer true (block 150, "NO"), the method advances to block 190 and the following conditions are checked:

$$\begin{bmatrix} \text{SIA\_CR "Near"} \geq \text{Min\_CR} \\ \text{AND} \\ YawRate \text{ "Far"} \geq \text{Min\_YawRt} \end{bmatrix}, \quad (13)$$

OR $$\begin{bmatrix} \text{SIA\_CR "Near"} > \text{Zero\_CR} \\ \text{AND} \\ \text{SIA\_CR "Near"} < \text{Min\_CR} \end{bmatrix} \quad (14)$$

AND [$YawRate$ "Far" ≥ Med_YawRt], where "Min_CR", "Zero_CR", and "Min_YawRt" are tunable parameters. It should be noted that Zero_CR may not necessarily truly be equal to zero, but rather may be a low value of SIA change rate that may effectively be considered the same as zero.

If block 190, "YES", a second width reduction is applied to the CTZ at block 200. The second width reduction narrows the CTZ less restrictively than the first width reduction (the CTZ with the second width reduction applied is wider than with the first width reduction applied). The CTZ with the second width reduction is still narrowed enough to reduce the amount/rate of false warnings caused by roadside objects to an acceptably low level for the given conditions.

The second width reduction is maintained until one of the following conditions is true:
The second width reduction timer has elapsed (block 210, "YES"), and the block 190 checks return a "NO," at which point the routine continues to block 240 (the duration of the second width reduction timer is tunable); or SIA_CR "Near" increases such that SIA_CR "Near"≥Peak_CR (Block 220, "YES"), at which point the routine returns to block 130 and all warnings are blocked; or Yaw Rate Change "Far" and SIA_CR "Near" both increase such that Eqn. 12 is true (block 230, "YES"), at which point the method returns to block 160 and the first width reduction is applied to the CTZ.

When the routine reaches block 240, any one of the warning reduction measures may be in force: a) the complete warning block applied at block 130, b) the first CTZ width reduction applied at block 160, or c) the second CTZ width reduction applied at block 200. That current warning reduction measure is maintained as long as:

$$\begin{bmatrix} \text{SIA\_CR "Near"} > \text{Zero\_CR} \\ \text{AND} \\ \text{SIA\_CR "Near"} < \text{Min\_CR} \end{bmatrix} AND \ [YawRate \text{ "Far"} < \quad (15)$$

Med_YawRt], where "Zero_CR", "Min_CR", and "Med_YawRt" are tunable parameters.

The CTZ width is only maintained so long as block 240 returns a YES result. When block 240 returns a NO result, the method proceeds to block 260, where the warning reduction measures are removed and the CTZ returns to its original, unreduced width (block 270). This is true when:

[SIA_CR"Near"≤Zero_CR] (16)

Figure 5:
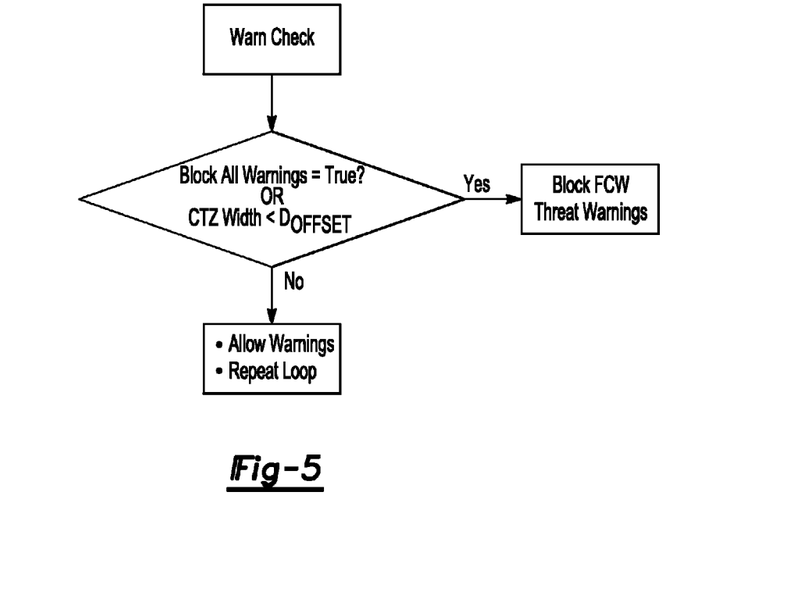
FIG. 5 is a subroutine used in the method of FIG. 4.

FIG. 5 depicts the Warning Check subroutine that is performed continually during operation of the FCW system. Threat warnings are blocked if: The "Block All Warnings" condition from block 130 is in force; or $D_{OFFSET}$ (the lateral distance of the detected target from the predicted host vehicle path) is greater than the CTZ width in force at the current time. If the $D_{OFFSET}$ of a detected target is within the width of the CTZ, then the target is considered valid and a warning can be provided.

The method disclosed herein is designed to minimize false warnings due to detection of side-of-path objects during curve entry and decreasing radius curves, while still maintaining positive test performance for steady state curves where the vehicle yaw rate and subsequent path prediction are stable. As with any method of this type, trade-offs must be made between how aggressively it removes side-of-path objects and how well it provides positive function on steady curves. To help manage this tradeoff, the method has a number of tunable parameters that affect, in varying degrees, how the filter performs. Five examples of possible tuning strategies are provided here to aid in understanding different tuning approaches that may be taken.

EXAMPLE I

Maximum True Warning in Curves, Minimum False Warning Rejection

One possible tuning approach to maximize the ability to provide warnings in curves for true threats is:

Set the SIA-based $D_{OFFSET}$ calculation to predict vehicle yaw rate, when taking the variation of the SIA-based $D_{OFFSET}$ into account, which is less than or equal to the real vehicle yaw rate for the magnitude of steering input.

Set the SIA_CR "Max" threshold to be relatively high, such that warnings will only be blocked for severe steering events.

Set the SIA_CR "Min" and Yaw Rate Change "Far" thresholds to require greater steering input and prior yaw rate for achieving the first and second filter adjustments.

Set the first and second filter adjustments to make smaller CTZ width adjustments compared to other tuning options. Note, the CTZ width adjustment is a ratio of the full CTZ width. Therefore, a smaller CTZ width adjustment is accomplished using parameter settings that are closer to 1.0.

May be able to set SIA_CR "Min" to a low value as non-zero SIA when driving straight will have less effect on the SIA-based $D_{OFFSET}$ due to the tuning above.

The potential benefits achieved with this type of tuning is removal of some false warnings at curve entry where the SIA-based $D_{OFFSET}$ will still predict that the object will be to the side of path, even the tuning for the $D_{OFFSET}$ calculation is in general less than what the yaw rate based $D_{OFFSET}$ would be. In this case objects close to the roadway in curves would tend to still provide false warnings, but those farther away may now be rejected.

EXAMPLE II

Some True Warning in Curves; Improved False Warning Rejection Through Significant CTZ Width Reduction Another tuning approach to improve false warning rejection, but still maintain some true warning capability is to use settings similar to Example 1, except to lower the thresholds required for CTZ width reduction and to make more significant CTZ width reductions. Compared to Example 1, these changes are Set the SIA_CR "Min" and Yaw Rate Change "Far" thresholds to require steering input and vehicle yaw rate change levels slightly higher than that expected during normal straight-line driving and testing for true warning performance.

Set the first and second filter adjustments to significantly reduce the CTZ width.

If possible, set the Min_SIA_Threshold to a low value (ideally zero) as non-zero SIA when driving straight will have less effect on the SIA-based $D_{OFFSET}$. A low setting can only be used if the SIA-based $D_{OFFSET}$ will still be considered an in-path object with the worst-case expected SIA during steady-state straight line driving.

This tuning has the potential to significantly reduce false warning events at curve entry through narrowing of the CTZ. Some true curve related warning performance may still be provided for targets that are centered in the host vehicle's path.

EXAMPLE III

Some True Warning in Curves; Improved False Warning Rejection Through "Higher Gain" SIA-Based $D_{OFFSET}$ A third tuning approach is similar to the second example in that it may provide some true warning performance in curves. The third approach is different in that it predicts greater SIA-based $D_{OFFSET}$, less CTZ width reduction, and requires that the Min SIA Threshold be set higher than the SIA required for straight-line driving. The parameters are set as:

Set the SIA-based $D_{OFFSET}$ calculation to predict vehicle yaw rate, when taking the variation of the SIA-based $D_{OFFSET}$ into account, which varies between equal to and greater than the real vehicle yaw rate for the magnitude of steering input.

Set the SIA_CR "Min" and Yaw Rate Change "Far" thresholds to lower levels than used for Example 1. The Yaw Rate Change "Far" second threshold can be just above the yaw rate experienced during normal straight line road driving. The Yaw Rate Change "Far" first threshold can be set slightly higher, but not so high that it is rarely achieved during curve entry events when "real-world" tests are conducted.

Set the first and second filter adjustments to smaller CTZ width adjustments compared to Example 2.

The Min_SIA_Threshold must be set above the maximum steady state SIA that can be expected during straight line driving.

This tuning can provide some true curve related warning performance, but the performance will degrade as the SIA increases or with sudden steering changes. Also, this approach cannot provide false curve entry warning rejection for situations where the SIA has not exceeded the Min_SIA_Threshold.

EXAMPLE IV

Minimum Warning in Curves; Maximum False Warning Rejection Through Very High SIA-Based $D_{OFFSET}$ The fourth example is an extension from Example 3, by setting the SIA-based $D_{OFFSET}$ to be very high. Compared to Example 3, the settings are:

Set the SIA-based $D_{OFFSET}$ calculation to be very high.

This tuning provides little to no performance in curves as targets will be immediately calculated as outside the CTZ once the SIA exceeds the Min_SIA_Threshold.

EXAMPLE V

Minimum Warning in Curves; Maximum False Warning Rejection Using Lower SIA_CR Thresholds This example uses lower SIA_CR thresholds for blocking warnings. Some warning performance could be provided for curves if the SIA_CR remains low (e.g., steady steering in the curve). Also, the SIA-based $D_{OFFSET}$ is tuned to ensure all targets are still considered.

Set the SIA_CR "Max" threshold to be slightly above SIA_CR values that can be expected for straight line driving and testing.

Set the SIA-based $D_{OFFSET}$ calculation to predict vehicle yaw rate which is very low. This essentially removes the SIA-based $D_{OFFSET}$ from rejecting any targets.

This tuning essentially makes the curve entry filter a SIA_CR filter. It is similar to Example 2 in that lower threshold levels of SIA_CR are used. In Example 2, SIA_CR levels above the thresholds lead to reduced CTZ widths whereas in this example they lead directly to a complete block of warnings. Under some test conditions, noise on the SIA_CR signal may prevent setting the SIA_CR threshold low enough to provide excellent false warning rejection while robustly providing warnings for true threat situations when driving straight.

In addition to these tuning examples, there is tuning flexibility associated with the signal tracking look-back periods selected for the "far" and "near" signals. For example, the use of longer tracking times for SIA_CR "Near" and Yaw Rate Change "Far" leads to larger signal change outputs as the maximum and minimum are tracked over a longer time period. This affects the key tracked signals as follows:

If a longer tracking/history time is used for SIA_CR "Near":

Thresholds will be met more quickly and false warnings, therefore, may be rejected more quickly.

The CTZ width may not reset as quickly due to the signal not dropping below the SIA_CR Zero Threshold level as quickly or often.

The time between updates will increase:

$$\left[ SWA\_CR - Time\_Between\_Updates = \frac{SWA\_CR\_Near\_TrackingTime}{5} \right]$$

If a longer tracking/look-back period time is used for YawRate "Far", thresholds will be met more quickly and false warnings may therefore be rejected more quickly The time between updates will increase:

$$\left[ YawRate - Time\_Between\_Updates = \frac{YawRateFar\_TrackingTime}{10} \right]$$

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of forward collision warning for a motor vehicle comprising:
    operating a sensor system to detect a target ahead of the vehicle;
    identifying a Collision Threat Zone (CTZ) along a predicted path of the vehicle;
    continuously measuring a steering input angle (SIA) change rate and a yaw rate of the vehicle;
    continuously tracking a near-past maximum absolute value of the SIA change rate during a first look-back period;
    continuously tracking a far-past variation of the yaw rate during a second look-back period longer than the first look-back period;
    applying a first width-reduction to at least a portion of the CTZ in the event that a) the near-past maximum absolute value of SIA change rate exceeds a first SIA change rate threshold, and
    b) the far-past variation of yaw rate exceeds a first yaw rate threshold value; and
    suppressing a threat warning based on detection of the target if the target is outside of the CTZ with the first width-reduction applied.

2. The method of claim 1 further comprising:
    continuously measuring a driver brake application;
    continuously tracking a near-past change in the driver brake application during a third look-back period shorter than the second look-back period;
    suppressing the threat warning if: a) the near-past change of the driver brake application exceeds a first DBA threshold value; and b) at least one of the near-past maximum absolute value of SIA change rate and the far-past variation of yaw rate exceed the first SIA change rate threshold and the first yaw rate threshold value respectively.

3. The method of claim 1 further comprising:
    suppressing the threat warning if the near-past maximum absolute value of SIA change rate exceeds a peak value higher than the first SIA change rate threshold.

4. The method of claim 1 further comprising:
    applying a second width-reduction to at least a portion of the Collision Threat Zone, the second width-reduction being less restrictive than the first width reduction if: a) the near-past maximum absolute value of SIA change rate exceeds the first SIA change rate threshold; and b) the far-past variation of yaw rate exceeds a second yaw rate threshold lower than the first yaw rate threshold; and
    suppressing the threat warning if the target is outside of the CTZ with the second width-reduction applied.

5. The method of claim 1 further comprising:
    applying a second width-reduction to at least a portion of the CTZ, the second width-reduction being less restrictive than the first width reduction, if: a) the near-past maximum absolute value of SIA change rate is less than the first SIA change rate threshold but exceeds a second SIA change rate threshold lower than the first SIA change rate threshold; and b) the far-past variation of yaw rate exceeds the first yaw rate threshold; and
    suppressing the threat warning if the target is outside of the CTZ with the second width-reduction applied.

6. The method of claim 1 wherein the predicted path of the vehicle is calculated by estimating a future yaw rate based on measured values of a vehicle speed and a steering input angle.

7. The method of claim 1 wherein the first width reduction is removed if the conditions for applying the first width reduction do not exist at the end of a time period.

8. The method of claim 1 wherein the first width reduction comprises reducing the CTZ width to zero.

9. A method of forward collision warning for a motor vehicle comprising:
    operating a sensor system to detect a target ahead of the vehicle;
    identifying a Collision Threat Zone along a predicted path of the vehicle;
    continuously measuring a steering input angle (SIA) change rate, a yaw rate, and a driver brake application;
    continuously tracking a near-past maximum absolute value of the SIA change rate during a first look-back period;
    continuously tracking a far-past variation of the yaw rate during a second look-back period longer than the first look-back period;
    continuously tracking a near-past variation of the driver brake application during a third look-back period shorter than the second look-back period; and suppressing threat warnings related to the target if: a) the near-past variation of the driver brake application exceeds a DBA threshold; and b) the near-past maximum absolute value of SIA change rate exceeds a first SIA change rate threshold OR the far-past variation of yaw rate exceeds a medium yaw rate threshold.

10. The method of claim 9 further comprising:
suppressing threat warnings related to the target if the near-past maximum absolute value of SIA change rate exceeds a peak value higher than the first SIA change rate threshold.

11. The method of claim 9 further comprising:
applying a first width reduction to the CTZ if: a) the near-past variation of the driver brake application does not exceed the DBA threshold; and b) the near-past maximum absolute value of SIA change rate exceeds the first SIA change rate threshold; and c) the far-past variation of yaw rate exceeds the medium yaw rate threshold value; and
suppressing a threat warning if the target is outside of the CTZ with the first width reduction applied.

12. The method of claim 9 wherein the predicted path of the vehicle is calculated by estimating a future yaw rate based on measured values of a vehicle speed and a steering input angle.

13. The method of claim 9 wherein the first width reduction is removed from the CTZ if the conditions for applying the first width reduction do not exist at the end of a time period.

14. The method of claim 9 wherein the first width reduction comprises reducing the CTZ width to zero.

15. A method comprising:
operating a forward collision warning sensor of a motor vehicle to detect a target ahead of the vehicle;
identifying a collision threat zone (CTZ) ahead of the vehicle in which the target is considered a collision threat, the CTZ having a base width;
continuously measuring a steering input angle (SIA) change rate, a driver brake application (DBA), and a yaw rate;
finding a degree of near-past DBA during a first look-back period;
finding a degree of near-past SIA change rate during a second look-back period;
finding a degree of far-past yaw rate during a third look-back period longer than the first and the second look-back periods;
applying a first width reduction to the CTZ if either 1) the near past SIA change rate exceeds a peak SIA change rate threshold, or 2) the near-past DBA indicates braking and either a) the near past SIA change rate exceeds a second SIA change rate threshold lower than the peak SIA change rate threshold or b) the far-past yaw rate exceeds a first yaw rate threshold; and
suppressing a threat warning if the target is outside of the CTZ with the first width reduction applied.

16. The method of claim 15 further comprising:
in the event that the conditions to apply the first width reduction are not met, applying a second width reduction less restrictive than the first width reduction to the CTZ when: a) the near-past maximum absolute value of SIA change rate exceeds the second SIA change rate threshold, and b) the far-past variation of yaw rate exceeds the first yaw rate threshold value; and
suppressing the threat warning if the target is outside of the CTZ with the second width-reduction applied.

17. The method of claim 16 further comprising:
in the event that the conditions to apply the first width reduction are not met and the conditions to apply the second width reduction are not met, applying a third width reduction less restrictive than the second width reduction to the CTZ when: a) the near-past maximum absolute value of SIA change rate exceeds the second SIA change rate threshold; and b) the far-past variation of yaw rate exceeds a second yaw rate threshold lower than the first yaw rate threshold; and
suppressing the threat warning if the target is outside of the CTZ with the third width-reduction applied.

18. The method of claim 16 further comprising:
in the event that the conditions to apply the first width reduction are not met and the conditions to apply the second width reduction are not met, applying a third width reduction less restrictive than the second width reduction to the CTZ when at least one of: a) the near-past maximum absolute value of SIA change rate is less than the second SIA change rate threshold but exceeds a third SIA change rate threshold lower than the second SIA change rate threshold; and b) the far-past variation of yaw rate exceeds the first yaw rate threshold; and
suppressing the threat warning if the target is outside of the CTZ with the third width-reduction applied.

19. The method of claim 15 wherein the first and second look-back periods are the same duration.

20. The method of claim 15 wherein the first width reduction results in the CTZ having a width of zero.

\* \* \* \* \*